United States Patent [19]

Ishiwata et al.

[11] 4,227,599
[45] Oct. 14, 1980

[54] AUTOMATIC CLUTCH

[75] Inventors: Hideyuki Ishiwata, Kawasaki; Kunihiro Ishino, Yokohama, both of Japan

[73] Assignee: Automobile Parts Manufacturing Company Limited, Japan

[21] Appl. No.: 916,144

[22] Filed: Jun. 16, 1978

[51] Int. Cl.² .................. F16D 11/00; F16D 43/02
[52] U.S. Cl. .................. 192/54; 192/67 R; 192/93 A; 403/1
[58] Field of Search ........... 192/54, 49, 50, 67 R, 192/67 A, 93 A, 31, 35, 36; 403/1

[56] References Cited

U.S. PATENT DOCUMENTS

| | | | |
|---|---|---|---|
| 3,055,471 | 9/1962 | Warn et al. | 192/35 X |
| 3,217,847 | 11/1965 | Petrak | 192/67 R X |
| 3,306,406 | 2/1967 | Poliseo | 192/35 X |
| 3,656,598 | 4/1972 | Goble | 192/50 X |

*Primary Examiner*—Rodney H. Bonck
*Attorney, Agent, or Firm*—McGlew and Tuttle

[57] ABSTRACT

An automatic clutch comprises, on the driving side, a drive clutch movable only axially relative to the associated drive members and normally biased in the declutching direction, a stationary inner cam located on the side toward which the drive clutch is biased and moved, the inner cam being connected to or disconnected from the drive clutch accordingly as the clutch disengages or engages, and a holdout ring having projections to be engaged with lands of the inner cam and adapted to keep the drive clutch and the inner cam out of connection when the driving side stops, the holdout ring being fitted over the drive clutch under such frictional conditions that, only when the ring has engaged the inner cam, it can circumferentially slide relative to the drive clutch. The automatic clutch further comprises, on the driven side, a driven clutch movable only axially relative to the associated driven members and normally biased in the clutching direction.

3 Claims, 6 Drawing Figures

AUTOMATIC CLUTCH

This invention relates to an automatic clutch to be disposed between driving and driven members to connect and disconnect the two.

The all-wheel drive employed by certain automobiles and the like is an effective system for making full use of the driving power and braking force of the engine when the vehicle runs on snow-laden or frozen roads, hills, wastelands or other rough terrains. On ordinary hard-surfaced roads, however, the all-wheel driven vehicle would involve the operation of the excess drive-shaft power train and hence wasteful consumption of energy and extra running noise. For these reasons a special clutch, i.e., free-wheel hub, which disconnects the unnecessary drive-shaft system not only from the driving side but also from the wheel side, is in use. To actuate the free-wheel hub, the driver usually has to stop the vehicle, go to the vinicity of each wheel equipped with such a hub, and then shift the hub position by hand. In attempts to obviate the inconveniences, mechanisms designed for automatic rather than manual control have been developed in recent years. Nevertheless, they have still shortcomings in that the engine brake will not work, the construction is relatively complex, or the mechanism is actuated whenever the vehicle stops.

SUMMARY OF THE INVENTION

It is a primary object of this invention to provide an automatic clutch which is disposed between driving and driven members and is capable of automatically connecting and disconnecting the same.

Another object of the invention is to provide an automatic clutch to be incorporated in a free-wheel hub for use with all-wheel driven vehicles and which is not disengaged unless the driven side is turned reversely.

These objects are attained by providing an automatic clutch which comprises, on the driving side, a drive clutch movable only axially relative to the associated drive members and normally biased in the declutching direction, a stationary inner cam located on the side toward which the drive clutch is biased and moved, the inner cam being connected to or disconnected from the drive clutch accordingly as the clutch disengages or engages, and a holdout ring having projections to be engaged with lands of the inner cam and adapted to keep the drive clutch and the inner cam out of connection when the driving side stops, the holdout ring being fitted over the drive clutch under such frictional conditions that, only when the ring has engaged the inner cam, it can circumferentially slide relative to the drive clutch, and, on the driven side, a driven clutch movable only axially relative to the associated driven members and normally biased in the clutching direction.

The above and other objects, advantages, and features of the invention will become apparent from the following description taken in conjunction with the accompanying drawings showing a preferred embodiment thereof.

DESCRIPTION OF THE PREFERRED EMBODIMENTS

Figure 1:
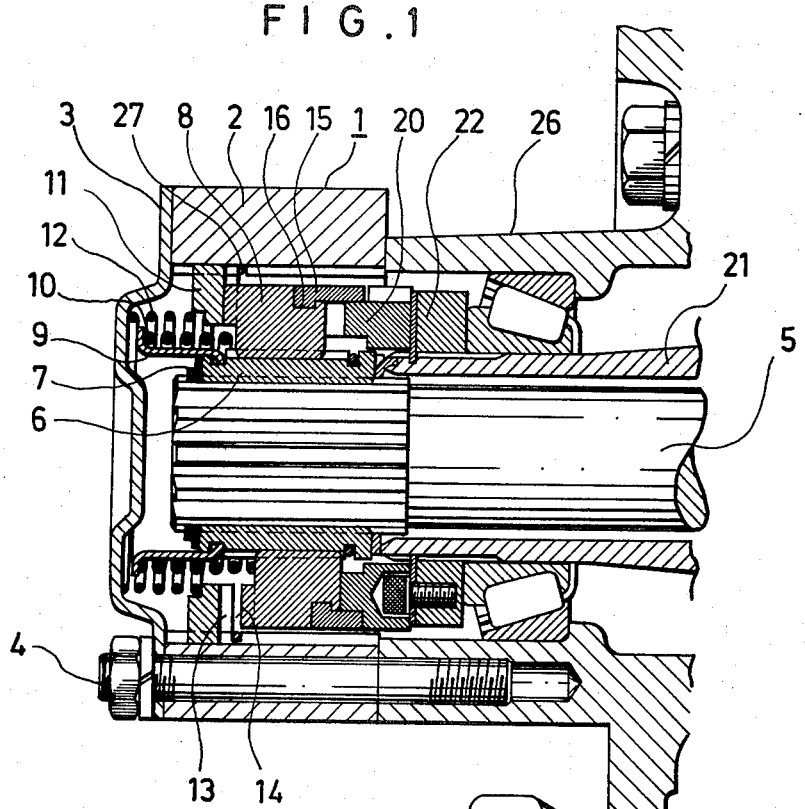
FIG. 1 is a sectional side view of an embodiment of the invention, the lower half showing the clutch disengaged and the upper half the clutch engaged.
Figure 6:
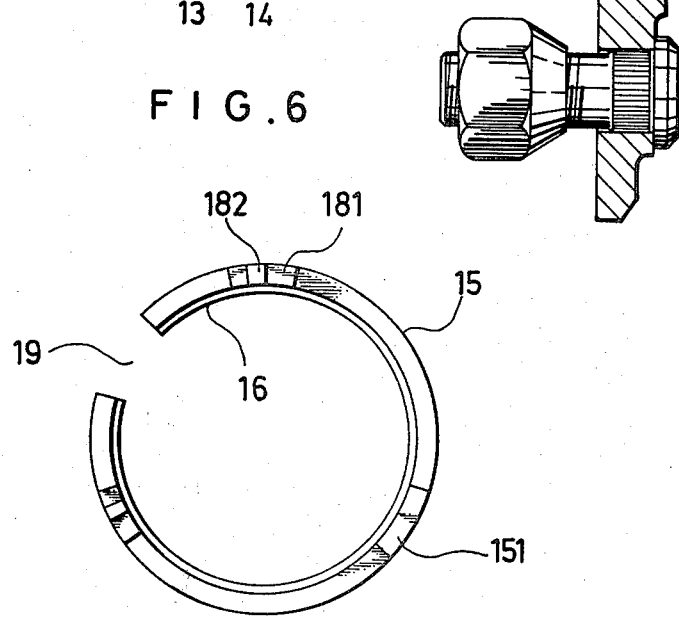
FIG. 6 is a side view of the holdout ring.

The automatic clutch of the present invention will now be described as applied to a free-wheel drive for an all-wheel driven vehicle.

Referring to the drawings, a free-wheel hub assembly is indicated generally at 1, with a housing 2 and a hub cap 3 both secured to the wheel side of a vehicle by bolts and nuts 4. A drive shaft 5 connected to a prime mover not shown carries a sleeve 6 on the opposite end portion as shown. The two are connected, for example, by splining so that they are rotated together but can axially move relative to each other. By means of a snap ring 7 the sleeve 6 is kept from slipping off the drive shaft 5.

An annular drive clutch 8 is engaged at its inner peripheral surface with the outer peripheral surface of the sleeve 6, for example, by splining. With the outer end of the sleeve 6 is fixedly engaged an end of an annular spring retainer 9, which retains a spring 10 biasing the drive clutch 8 rightwardly as viewed in FIG. 1.

The numeral 11 designates an annular driven clutch, the outer peripheral surface of which is engaged, for example, by splining, with the inner peripheral surface of the housing 2. Between the driven clutch 11 and the hub cap 3 is disposed a spring 12 biasing the driven clutch 11 rightwardly.

On the inner periphery of the housing 2 is fitted a stopper ring 27, which provides a limit to the movement of the driven clutch 11. The driven clutch 11 and the drive clutch 8 have teeth 13 and 14, respectively, adapted to mesh with each other.

A holdout ring 15 is fitted in a steplike recess formed on the outer periphery of one end portion of the drive clutch 8. The holdout ring 15 includes an annular inward projection 17 formed on the inner periphery of one end portion to engage an annular groove 16 on the outer periphery of the drive clutch 8, so that the annular projection 17 keeps the holdout ring 15 from slipping off the drive clutch 8. The holdout ring 15 and the drive clutch 8 are engaged under such frictional conditions that they can slide relative to each other only when a turning force above a predetermined value is applied. The other end of the holdout ring 15 has a plurality of projections 18 formed endwise at given intervals. Each projection 18 consists of a circumferentially broadened first-step projection 181 and a narrow second-step projection 182 extended axially from the middle portion of the first step. Each shoulder 183 formed by the steplike projections 181, 182 is adapted to mesh with each projection or land 25 of an inner cam 20 to be described later, so as to keep the drive clutch 8 from moving axially and keep the same from engaging the inner cam 20. Each side of the second-step projection 182 is adapted to contact the corresponding side of the land 25 of the inner cam 20, thereby to retain the holdout ring 15 unrotatably. The height (or axial length) of the first-step projection 181 is predetermined so that, when cam teeth 23 of the drive clutch 8 and cam teeth 24 of the inner cam 20 have ridden on each other, with their tooth tops in contact, the lands 25 of the inner cam 20 engage the projections 181. The driven clutch 11 and the drive clutch 8 are disengaged when the cam teeth 23 and 24 of the drive clutch 8 and the inner cam 20, respectively, are in mesh. The holdout ring 15 is partially cut away at 19. Therefore, in order to fit the holdout ring 15 over the drive clutch 8, it is only necessary to spread the ring 15 until its annular projection 17 snaps into the groove 16.

The inner cam, indicated at 20, is fixedly mounted on a nuckle 21 of the vehicle by conventional means. In the embodiment shown, the inner cam 20 is secured in place by an adjust nut 22 which is threadedly engaged with the nuckle 21. On the opposing faces of the drive clutch 8 and the inner cam 20 are formed each a plurality of cam teeth 23 or 24 in an annular row. Those cam teeth have flat lands and can be intermeshed when staggered. The inner cam 20 also has a given number of broad segmental projections or lands 25 on its outer periphery. The numeral 26 indicates a hub body.

Figure 2:
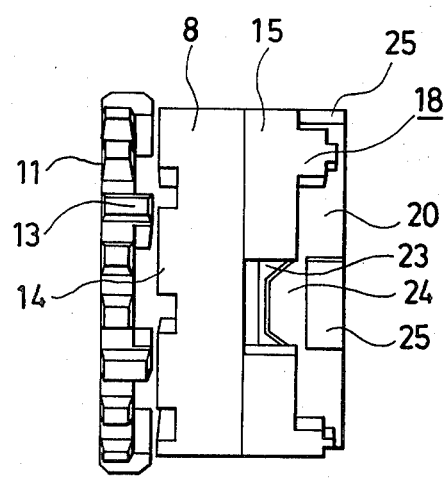
FIG. 2 is a side view of essential parts showing the clutch disengaged.
Figure 4:
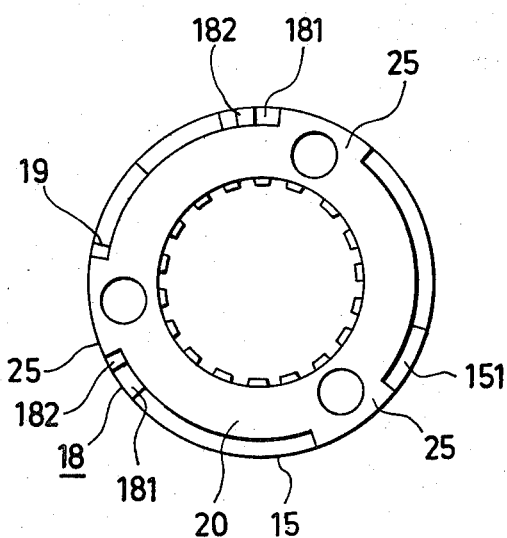
FIG. 4 is an end view of the arrangement of FIG. 3 as seen in the direction of the arrow P, with some parts omitted.

The free-wheel hub incorporating the present invention, in the disengaged state, is shown in section in the lower half of FIG. 1 and in FIG. 2. In these views the teeth 13 of the driven clutch 11 are out of mesh with the teeth 14 of the drive clutch 8. Consequently, the turning force transmitted from the wheels through the hub body 26, housing 2, and driven clutch 11 is not applied to the drive clutch 8, thus leaving the wheels free. The drive system, from the drive clutch 8 up to the differential gear and propeller shaft (both not shown) through the drive shaft, is not rotated by the turning force from the wheels.

Figure 3:
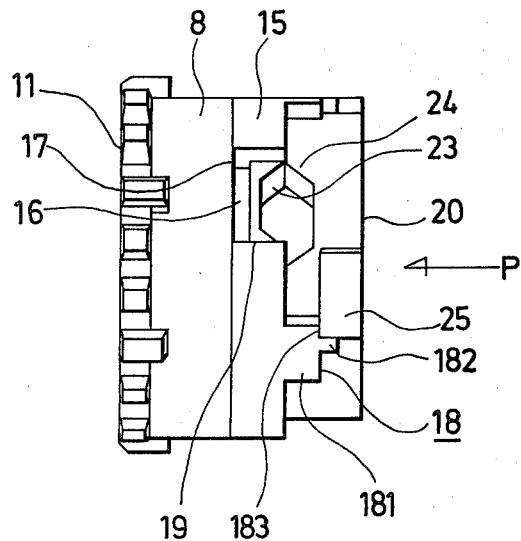
FIG. 3 is a view similar to FIG. 2 but showing the clutch engaged.
Figure 5:
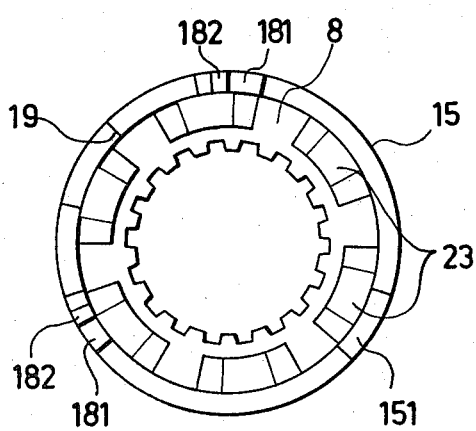
FIG. 5 is a view similar to FIG. 4 but without the inner cam.

The free-wheel hub in the engaged state during all-wheel drive is illustrated in section in the upper half of FIG. 1 and in FIG. 3. Now if the front-drive system of the transfer is set to the ON position for all-wheel driving, the drive from the engine is transmitted to the drive shaft 5. Then, through the sleeve 6, the drive shaft 5 causes the drive clutch 8 to begin running. As a result, the cam teeth 23 of the drive clutch 8 initially in mesh with the cam teeth 24 of the inner cam 20 secured to the vessel body are disengaged, riding over the lands of each other. This causes the drive clutch 8 to move, against the pressing force of the spring 10, leftwardly as viewed in FIG. 1, until its teeth 14 mesh with the teeth 13 of the driven clutch 11. When those teeth meet out of phase, with the tooth tops in contact, the driven clutch 11, too, moves leftwardly for a moment against the force of the spring 12. With further rotation of the drive clutch 8 the teeth 14 and 13 soon come in the same phase where they will mesh with each other thanks to the recovering force of the spring 12.

On the other hand, the holdout ring 15 rotates as the drive clutch 8 runs. However, as the inner cam 20 and the drive clutch 8 continue to run, with the tops of their cam teeth 24, 23 riding on each other, the two-step projections 18 on the periphery of the holdout ring 15 come in contact with the sides of the lands 25 protruding from the inner cam 20. In other words, the corners of the lands 25 are fitly supported by the shoulders 183 formed by the first-step projections 181 and the second-step projections 182 of the projections 18. (FIG. 3) This enables the holdout ring 15 alone to stop in that position, allowing the drive clutch 8 to continue running while maintaining its sliding relation with the holdout ring. Since the corners of the lands 25 of the inner cam 20 remain engaged with the shoulders 183 of the projections 18 of the holdout ring 15, the drive clutch 8 is kept from moving toward the inner cam 20 by the sides of its first-step projections 181. Thus, even if the drive clutch 8 may at any point during the rotation bring its cam teeth 23 to the same phase as the cam teeth 24 of the inner cam 20, the both teeth will not mesh at all. The drive from the drive shaft 5 is now transmitted through the sleeve 6, drive clutch 8, driven clutch 11, housing 2, and hub 26 to the wheel.

In the arrangement described, the drive clutch 8 and the driven clutch 11 remain in mesh while they are rotating in the same direction, regardless of whether the engine is driving or the engine brake is being applied. If the drive clutch 8 and the driven clutch 11 in mesh are rotated reversely (for example, when the advancing vehicle is temporarily driven back), they will be disengaged for a moment but will soon be reengaged, because the other sides of the lands 25 of the inner cam 20 contact the other projections 18 of the holdout ring 15. This condition is maintained as long as the transfer is in the front-drive position.

The procedure for releasing the free-wheel hub will now be explained. First, the front-drive of the transfer is shifted to the OFF position to shut off the transmissions of the turning force to the drive shaft 5. Next, the driven clutch 11 and the associated parts are caused to run in the reverse direction. Actually this can be accomplished by merely driving the vehicle slowly in the opposite direction. The distance of the reverse movement may be not more than about a quarter revolution of the wheels. This enables the turning force from each wheel to be transmitted through the hub 26, housing 2, driven clutch 11, and drive clutch 8 to the holdout ring 15. The rotation of the holdout ring 15 brings the shoulders 183 of its projections 18 out of engagement with the corners of the lands 25 of the inner cam 2. As a consequence, the drive clutch 8 is moved rightward as viewed in FIG. 1 by the force of the spring 10 into mesh with the inner cam 20, at the point where the phase of the cam teeth 23 of the drive clutch 8 coincides with that of the cam teeth 24 of the inner cam 20. The driven clutch 11 and the drive clutch 8 are then disengaged and, as already stated, they are not reengaged unless they take up the drive from the drive shaft 5.

Thus, the mechanism according to the invention is built so that, located between driving and driven members, it can accomplish automatic connection and disconnection of the two. By way of example, let the driving and driven members be, respectively, A (corresponding to the drive-shaft side of the embodiment already described) and B (corresponding to the wheel side), then the arrangement incorporating the present invention will have the following functions:

(1) Turning the A side will engage the clutch, which will cause the rotation of the B side, too.
(2) As long as the A side is kept running (forward or reverse), the clutch will remain engaged and the drive can be established from whichever side, A or B.
(3) The clutch is disengaged only when the A side is brought to a stop (together with the B side, of course) and the B side is turned through a predetermined angle (to be suitably chosen according to the design conditions).
(4) After the clutch disengagement, the declutched state will continue as long as the A side is kept stationary. Hence the B side will be free to run forward, stop, and rotate backward.

As has been described hereinabove, the automatic clutch of the invention is disposed between rotatable members and can automatically control the transmission of the drive by simply controlling the rotation of the respective members. Moreover, it can keep the both members coupled unless the driven side is rotated reversely. When the clutch of the invention has been used with the free-wheel hub of an all-wheel driven vehicle or the like, for example, it is no longer necessary for the driver to get down from the vehicle and manipulate the free-wheel unit as in the part. Rapid and simple shifting of the unit is now possible. Unlike the existing automatic mechanisms which can automatically operate the free-wheel hub but render it impossible to apply the engine brake, the automatic clutch of the invention accomplishes the both. Also, it is free from the inconvenience of the conventional arrangements that, each time the vehicle stops, the clutch works to disengage the driving and driven members from each other, and it avoids the adverse effects of wear and other factors upon the life of the parts. Furthermore, the clutch of the invention is relatively simple in construction.

What is claimed is:

1. An automatic clutch for engaging associated drive members and associated driven members comprising, on the driving side, a drive clutch movable only axially relative to the associated drive members and normally biased in the de-clutching direction, a stationary inner cam located on the side toward which said drive clutch is biased for axially caming said drive clutch, said inner cam being connected to or disconnected from said drive clutch accordingly as said clutch disengages or engages, and a holdout ring having projections to be engaged with lands of said inner cam and adapted to keep said drive clutch and said inner cam out of connection unitl the driving side stops, said holdout ring being fitted over said drive clutch under such frictional conditions that, only when said holdout ring has engaged said inner cam, it can circumferentially slide relative to said drive clutch, and, on the driven side, a driven clutch movable only axially relative to the associated driven members and normally biased in the clutching direction.

2. An automatic clutch according to claim 1, wherein said holdout ring has an annular inward projection on its inner periphery at one end adapted to fit in a groove formed on the outer periphery of said drive clutch, and said first-mentioned projections of said holdout ring to be engaged with lands of said inner cam are disposed at the opposite end and comprise axially extending two-stepped projections.

3. An automatic clutch according to claim 2, wherein each of said two-stepped projections consists of a broad first-step projection and a narrow second-step projection further extending from the middle portion of each said first-step projection, said first-step projections being adapted to contact the lateral-end surface in the circumferential direction of said lands of said inner cam to keep said drive clutch from moving toward said inner cam, said second-step projections being adapted to contact the sides of said inner cam lands parallel to the axis thereof to prevent the turning of said holdout ring.

* * * * *

UNITED STATES PATENT AND TRADEMARK OFFICE
CERTIFICATE OF CORRECTION

PATENT NO. : 4,227,599

DATED : October 14, 1980

INVENTOR(S) : Hideyuki Ishiwata, et al

It is certified that error appears in the above—identified patent and that said Letters Patent is hereby corrected as shown below:

Item [30] should be added as follows:

-- [30]    Foreign Application Priority Data
       March 16, 1978  [JP] Japan ...............53-30332--

Signed and Sealed this

Third Day of November 1981

[SEAL]

Attest:

GERALD J. MOSSINGHOFF

Attesting Officer    Commissioner of Patents and Trademarks